(12) United States Patent
Balasubramanian et al.

(10) Patent No.: US 10,979,288 B2
(45) Date of Patent: Apr. 13, 2021

(54) DISTRIBUTED RULES ENGINE FOR PROCESSING EVENTS ASSOCIATED WITH INTERNET OF THINGS DEVICES

(71) Applicant: VMware, Inc., Palo Alto, CA (US)

(72) Inventors: Anand Balasubramanian, Bangalore (IN); Gangadhar Nittala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/744,742

(22) Filed: Jan. 16, 2020

(65) Prior Publication Data

US 2020/0153685 A1 May 14, 2020

Related U.S. Application Data

(63) Continuation of application No. 15/972,830, filed on May 7, 2018, now Pat. No. 10,567,220.

(51) Int. Cl.
| | | |
|---|---|---|
| *H04L 12/24* | (2006.01) | |
| *G06N 5/00* | (2006.01) | |
| *H04L 29/08* | (2006.01) | |

(52) U.S. Cl.
CPC .......... *H04L 41/0803* (2013.01); *G06N 5/00* (2013.01); *H04L 41/04* (2013.01); *H04L 41/06* (2013.01); *H04L 41/00* (2013.01); *H04L 67/12* (2013.01)

(58) Field of Classification Search
CPC ......... G06N 5/008; H04L 41/00; H04L 41/04; H04L 41/06; H04L 41/0803
See application file for complete search history.

(56) References Cited

U.S. PATENT DOCUMENTS

| | | |
|---|---|---|
| 9,893,940 B1 | 2/2018 | Chawla et al. |
| 10,567,220 B2 * | 2/2020 | Balasubramanian ... H04L 67/12 |
| 2007/0209074 A1 | 9/2007 | Coffman |
| 2009/0164985 A1 | 6/2009 | Balko et al. |
| 2010/0205205 A1 | 8/2010 | Hamel |

* cited by examiner

*Primary Examiner* — Kevin C. Harper
(74) *Attorney, Agent, or Firm* — Thomas | Horstemeyer LLP

(57) ABSTRACT

Disclosed are various examples for deploying a rules engine in a distributed fashion. A rule definition that defines a rule can be transformed in a network topology. The network topology can be deployed onto a cluster of computing devices or instances. In this way, the rules engine can be horizontally scalable such that is it not necessary to deploy the rules engine in a single computing instance.

20 Claims, 4 Drawing Sheets

DISTRIBUTED RULES ENGINE FOR PROCESSING EVENTS ASSOCIATED WITH INTERNET OF THINGS DEVICES

CROSS-REFERENCE TO RELATED APPLICATIONS

This application is a continuation of and claims the benefit of U.S. patent application Ser. No. 15/972,830, entitled "DISTRIBUTED RULES ENGINE FOR PROCESSING EVENTS ASSOCIATED WITH INTERNET OF THINGS DEVICES," and filed May 7, 2018, which is hereby incorporated by reference in its entirety.

BACKGROUND

Appliances, vehicles, sensors, controllers, actuators, and other devices can gather data and interact with the physical world. Certain devices or sensors are often referred to as Internet-of-Things (IoT) devices and can be utilized to improve the operations of various industries and provide new services. IoT devices can report sensor or status data to a gateway or management service, which can initiate actions in response to certain rules. For example, if the temperature of a refrigerated train car that is carrying ice cream is too high as reported by a connected sensor, a rules engine can initiate an action that can prevent spoilage or melting of the product. Other devices, such as smartphones, computers, and devices that are typically thought of as "smarter" devices than IoT devices, can also report information to a management service or rules engine that can take actions defined by an enterprise or a user.

Deploying a rules engine in an enterprise can involve the processing of a large number of rules that are continuously applied to a stream of a large number of events. Handling a large amount of data input with minimal downtime and the ability to deploy the rules engine across multiple computing instances in a cloud-based computing environment can allow an enterprise to deploy more rules engines to manage their devices and other resources in a distributed fashion.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a rules engine that can process data inputs received from client devices as well as Internet-of-Things (IoT) devices that report sensor or state information to the rules engine. These devices, in some instances, can be enrolled as managed devices with a management service. A rules engine according to examples of this disclosure can be implemented in a distributed fashion so that processing of a data input according to one or more rules set forth by the rules engine can be distributed across multiple physical or virtual computing devices or instances. Additionally, the rules that define the rules engine can also be updated without significantly affecting the uptime of the rules engine. The distributed nature of the rules engine provides for horizontal scaling of the rules engine so that it may not be necessary for the engine to be executed in a single computing device or environment.

Figure 1:
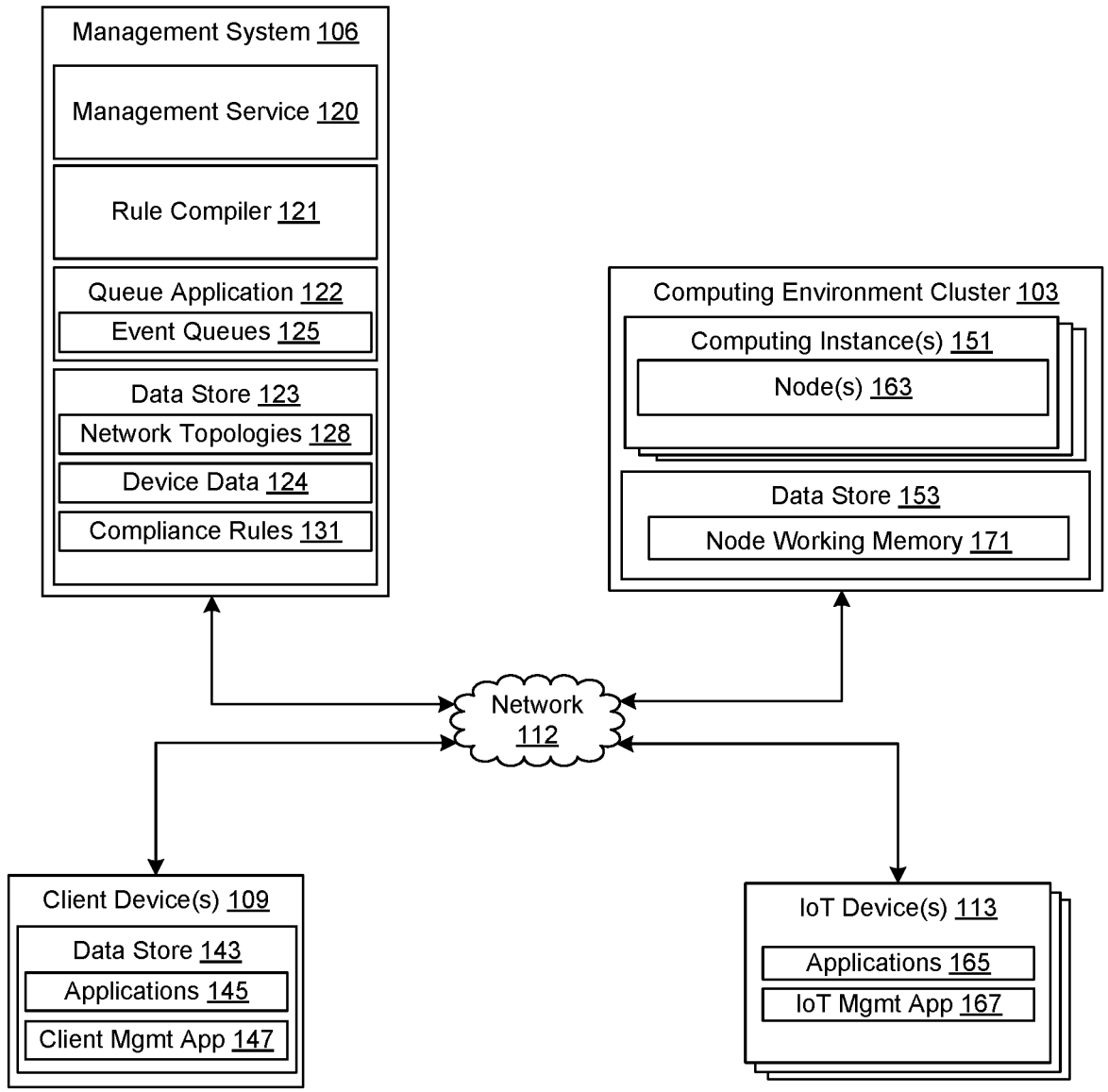
FIG. 1 is a drawing of an example of a networked environment according to one example of the disclosure.

With reference to FIG. 1, shown is an example of a networked environment 100. The networked environment 100 can include a computing environment cluster 103, a management system 106, a client device 109, a gateway 111, Internet-of-Things (IoT) devices 113, and other components in communication with one another over a network 112. In some implementations, the IoT devices 113 might communicate with the client device, management system 106, or other devices through an IoT gateway device.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The management system 106 can be customer or enterprise-specific. In some embodiments, the management system can be part of a local network and can be local to at least one of the other components of the networked environment, for example, as shown in FIG. 1. In other embodiments, the management system 106 can be remote from the other components, or the computing devices of the management system 106 can be located in a single installation or can be distributed among many different geographical locations local and/or remote from the other components. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120, a rule compiler 121, a queueing application 122, as well as other applications, services, processes, systems, engines, or functionality not discussed in detail herein. The components can be executed on different computing clusters or instances and the depiction shown in FIG. 1 is merely illustrative.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 106, mass storage resources of the management system 106, or any other storage resources on which data can be stored by the management system 106. The data stored in the data store 123 can include, for example, management data including device data, enterprise data, compliance rules, and management service data, as well as other data. The data store 123 can also include network topologies 128 that represent a rule that has been created within a rules engine according to examples of the disclosure. A network topology 128 represents a rule that has been compiled or transformed into a graph from a scripting or programming language in which the rule is defined. The network topology 128 can represent a network that is processed according to a Rete algorithm implementation.

The data stored in the data store 123 can be associated with the operation of the various applications and/or functional entities described. Client devices 109 and IoT devices 113 can be identified within the device data 125 by one or more of a device identifier, a unique device identifier (UDID), a media access control (MAC) address, an internet protocol (IP) address, or another identifier that uniquely identifies a device with respect to other devices. The device data 125 can include gateway data associated with gateways and other edge systems or edge devices through which IoT devices 113 can connect to the network 112. Gateway data can also include specifications, and for each gateway, a type of gateway or a gateway identifier 156 and other information. Specifications for the gateway can include hardware configurations including a chipset utilized by the gateway, a performance or capacity, a model identifier, and software configurations, including an agent application installed on the gateway.

Device data 125 can include data associated with a configuration of a client device 109 and/or IoT device 113. Device data 124 can include an identifier of the client device 109 or IoT device 113. The identifier can be a serial number, media access control (MAC) address, other network address, or another device identifier. In addition, the device data 125 can include an enrollment status indicating whether each client device 109 or IoT device 113 is enrolled with or managed by the management service 120. A client device 109 or IoT device 113 designated as "enrolled" can be permitted to access certain enterprise data, while a device designated as "not enrolled," or having no designation, can be denied access to the enterprise data.

Compliance rules 131 can include, for example, configurable criteria that must be satisfied for an enrolled one of the client devices 109 and IoT devices 113 to be in compliance with the management service 120. The compliance rules 131 can be based on a number of factors, including geographical location, activation status, enrollment status, and authentication data including authentication data obtained by a device registration system, time, date, and network properties, among other factors associated with each device. The compliance rules can also be determined based on a user account 137 associated with a user. In some cases, a gateway 111 can be unassociated with a user, but can nevertheless be associated with a service account, a gateway account 138, or another user account 137 that is unassociated with a user.

Compliance rules 131 can be based upon a particular state of a managed device. States can include, for example, a virus or malware being detected on the device, installation or execution of a blacklisted application and/or a device being "rooted" or "jailbroken," where root access is provided to a user of the device. Additional states can include the presence of particular files, questionable device configurations, vulnerable versions of applications, vulnerable states of IoT devices 113 or other vulnerability, as can be appreciated.

The management service 120 can oversee the management of devices, including the client devices 109 and IoT devices 113. The management service 120 can oversee the operation of the devices enrolled with the management service 120 as well as manage enrollment and un-enrollment operations for the devices, for example, using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the new management service 120 as discussed herein.

In some embodiments, an enterprise, such as one or more companies or other organizations, can operate the management service 120 to oversee or manage the operation of the client devices 109 of its employees, contractors, customers, students, or other users having user accounts with the enterprise. The enterprise can also operate the management service 120 to oversee or manage the operation of gateways 111 associated with the enterprise through which IoT devices 113 might communicate with the management service 120 or other services. An enterprise can be any customer of the management service 120. The management service 120 can remotely configure the client device 109 by interacting with an agent application executed on the client device 109. Likewise, the management service 120 can remotely configure IoT devices 113 or a gateway interacting with an application executed on the IoT devices 113 or gateway.

The rule compiler 121 can interpret rule definitions that specify various components of a rule executed by a rules engine. The rule compiler 121 can interpret a rule that is specified in a particular domain specific language and convert the rule into a network topology 128. A rule definition can specify three or more elements: entities, actions, and a rule. An entity identifies an input into the rules engine. For example, an entity can specify a particular sensor type, a device type, a location of the device, an identifier of the device, or other parameter with which an input into the rules engine can be identified.

A rule specifies a condition associated with one or more of a population of devices that can provide data inputs to a rules engine. For example, a rule can specify a condition associated with the location or roaming status of a mobile device that is enrolled with the management service 120. As another example, a rule can specify a condition associated with the temperature detected by a temperature sensor, such as a detected temperature above, equal to, or below a particular reference temperature.

An action specifies an action that can be taken in response to the condition or conditions specified by the rule being met. For example, the action can include an alert or notification sent to a particular user or device in response to the condition being met. As another example, the action can include initiating a process or routing by another device that takes an action in response to the condition. For example, if a temperature sensor indicates that the temperature within a freezer is above a threshold, the action can specify that an alert is generated and that a command is sent to an IoT device 113 activating a backup compressor. As yet another example, the action can include sending a notification to a user that the mobile device assigned to the user is in a particular geographic location or in a roaming state.

Figure 2:
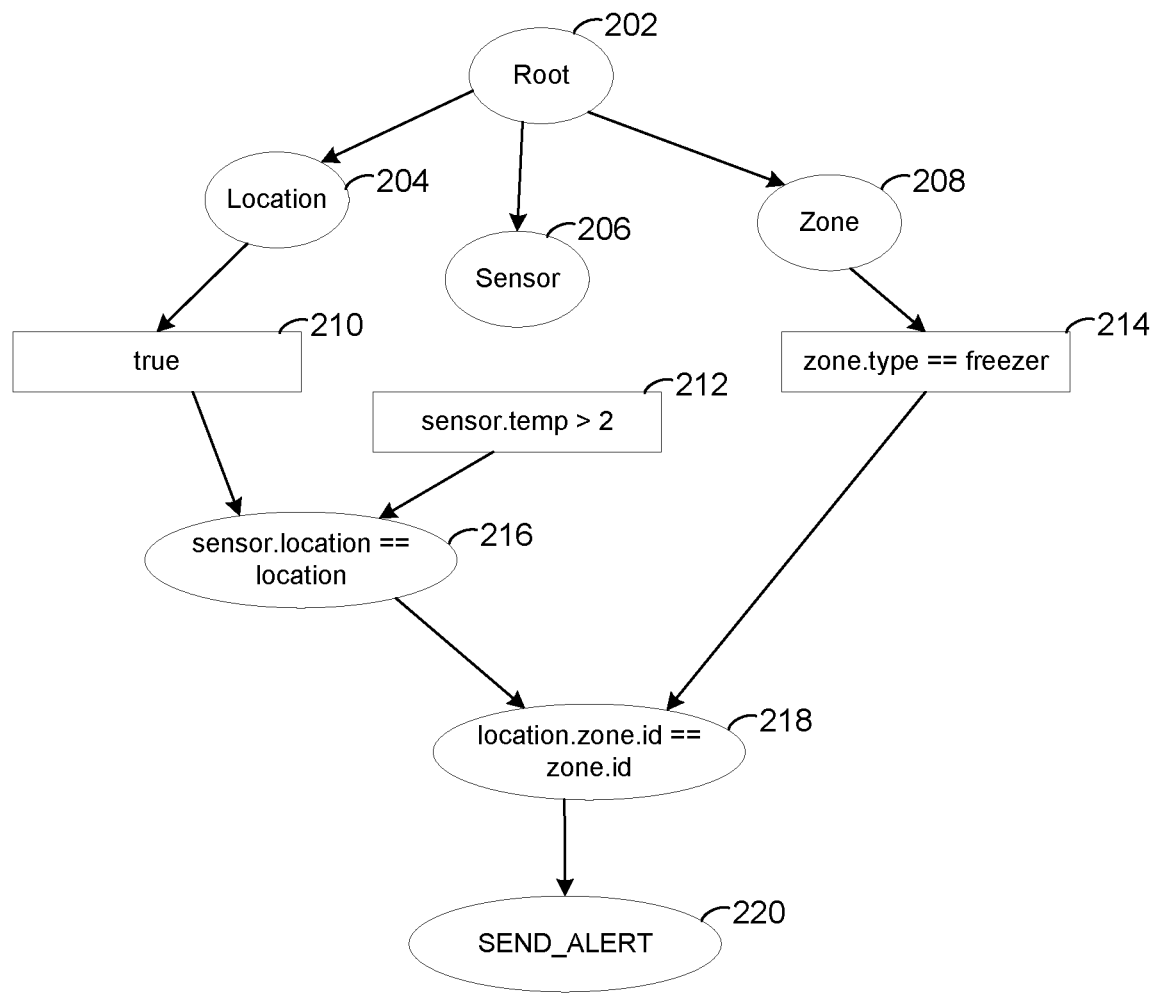
FIG. 2 is an example network topology according to various examples of the disclosure.

As depicted in FIG. 2 and discussed below, the network topology 128 corresponding to a particular rule definition can be represented by a directed acyclic graph or other data structure that can be generated by the rule compiler 121 and used to process events that occur within a population of devices that provide inputs to a root node of the network topology 128.

The queueing application 122 can implement event queues 125 that can receive event data from a population of devices over the network 112. An event queue 125 can be associated with a particular enterprise, event type, or a particular population of devices. An event queue 125 can be established to feed a rules engine implemented on a cluster of computing instances 151 onto which a network topology 128 is deployed. As events arrive from a population of devices, the events can be placed onto an event queue 125 established for a particular rules engine. The event data can be fed to a root node of the network topology 128 and processed according to a Rete algorithm, in one scenario. In some implementations, the event queue 125 for a particular rules engine or rule definition can be stored in the data store 123. In other implementations, the event queue 125 can be implemented by a queueing service, such as an Apache Kafka queue that feeds the root node of the network topology 128 to which the event queue 125 corresponds. The queueing application 122 can interoperate with such a queueing service to allow for creation and configuring of an event queue 125 as well as to facilitate updating a deployment of a network topology 128, as will be discussed below.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 143 that also includes applications 145, a client management application 147, and other data.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 165, such as a client management application 147, a browser application, or another application. The operating system and some applications 145 can access network content served up by the management system 106, or other servers, thereby rendering a user interface on a display, such as a liquid crystal display (LCD), organic light emitting diode (OLED) display, touch-screen display, or other type of display device.

To this end, some applications 145 can include a browser or a dedicated application, and a user interface can include a network page, an application screen, or other interface. The client device 109 can also access web applications using the browser application. Further, other applications 145 can include device management applications, enterprise applications, social networking applications, word processors, spreadsheet applications, media player applications, or other applications. The client management application 147 can be an application that performs certain functions in the enrollment of the client device 109 with the management service 120. The client management application 147 can perform actions as directed by the management service 120, for instance, by checking in with the management service 120, retrieving a command from the command queue, and implementing the command as discussed above.

In some implementations, the various IoT devices 113 can be in communication with one or more gateways. A gateway 111 can be one or more routing switches, integrated access devices (IADs), multiplexers, a variety of metropolitan area network (MAN) and wide area network (WAN) access devices, and other edge devices. The gateway can enable the IoT devices 113 access to the network 112 and to the management system 106.

The IoT devices 113 can be appliances, vehicles, sensors, controllers, actuators, and other physical devices including at least: a processor, network communication hardware, and a memory. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can execute the IoT management application 167 to perform or access the functionality described for the management system 106, including the management service 120, the rule compiler 121, and the queueing application 122.

The IoT device 113 can also be equipped with networking capability or networking interfaces, including a localized networking or communication capability, such as a near-field communication (NFC) capability, radio-frequency identification (RFID) read or write capability, or other localized communication capability. In some examples, the IoT device 113 is mobile where the IoT device 113 is easily portable from one location to another. In other situations, the IoT device 113 can be a thermostat, fixture, or other device that is not easily portable.

The IoT management application 167 can perform actions as directed by the management service 120 and/or a gateway. The management service 120 can maintain a command queue for the IoT device 113. The command queue for the IoT device 113 can include actions and commands that can enforce compliance rules 131 on the IoT device 113. The management service 120 or an application in a gateway can determine whether states exist on the IoT device 113 that are associated with one or more of the compliance rules 131 based on status data received from the IoT device 113, or pass status data received from the IoT device 113 to the management service 120 to perform the evaluation. If the IoT device 113 is not in compliance, the management service 120 or gateway can place a command to bring the IoT device 113 into compliance in a command queue for the IoT device 113. The IoT management application 167 can retrieve the command and perform an action on the IoT device 113. The IoT management application 167 can implement the command.

The computing environment cluster 103 can include a server computer or any other system providing computing capability. While referred to in the singular, the computing environment cluster 103 can include a plurality of computing devices that are arranged in one or more server banks, computer banks, or other arrangements. The computing environment cluster 103 can include a grid computing resource or any other distributed computing arrangement. The computing environment cluster 103 can be customer or enterprise-specific. In some embodiments, the management system can be part of a local network and can be local to at least one of the other components of the networked environment, for example, as shown in FIG. 1. In other embodiments, the computing environment cluster 103 can be remote from the other components, or the computing devices of the computing environment cluster 103 can be located in a single installation or can be distributed among many different geographical locations local to and/or remote from the other components. The computing environment cluster 103 can also include or be operated as one or more virtualized computer instances. For purposes of convenience, the computing environment cluster 103 is referred to herein in the singular. Even though the computing environment cluster 103 is referred to in the singular, it is understood that a plurality of computing environment clusters 103 can be employed in the various arrangements as described above.

The computing environment cluster 103 can represent a cluster of computing devices onto which the nodes of a network topology 128 can be deployed. The various nodes of a Rete graph created by the rule compiler 121 can be separated into nodes that can be addressable using a network address. The components within the computing environment cluster 103 can include computing instances 151, a data store 153 as well as other hardware, applications, services, processes, systems, engines, or functionality not discussed in detail herein. The components can be executed on different computing clusters or instances and the depiction shown in FIG. 1 is merely illustrative.

A rules engine that processes various rule definitions and events that flow from a population of devices can be implemented within the computing environment cluster 103. In this way, the rules engine can be implemented in a distributed fashion. The computing instances 151 can represent physical or virtual computing devices that can execute one or more nodes 163 of a network topology 128 that corresponds to a rule definition. For example, the rule compiler 121 can transform a rule definition written in a DSL into various nodes 163 of a Rete network or graph, or a network topology 128. The rule compiler 121 can then deploy the various nodes 163 of the network topology 128 into various computing instances 151 within the computing environment cluster 103.

A root node 163 of the topology can be connected to an event queue 125 that is created for the rule or for the rules engine. The other nodes 163 of the topology can be assigned network addresses so that they are addressable by other nodes 163 in the topology. The nodes 163 can be assigned a network address and communicate with one another according to the structure of the topology. In one scenario, a particular node 163 can be configured with information about how to communicate with its parent and children nodes 163, which can be executing on different computing instances 151 within the computing environment cluster 103.

The data store 153 can include mass storage resources, in-memory resources, caches, or other storage resources available to computing instances 151. Node working memory 171 can be implemented within the data store 153. Each of the nodes 163 can maintain a cache of data within node working memory 171 that represents event data has successfully matched their respective conditions. For example, the node working memory 171 can help ensure that a join node has to look only at its immediate parent nodes to evaluate a new match and not the entire preceding network. From a computational time standpoint, access to the node working memory 171 can aid in evaluating large number of conditions. The node working memory 171 can be implemented using a non-relational database such as HBase.

FIG. 2 shows an example network topology 128 that can be created from a rule definition. The network topology 128 shown in FIG. 2 represents a graph that can be generated from a rule definition written in a domain specific language. In the example shown in FIG. 2, a root node 202 can be configured to receive data inputs from an event queue 125 that is implemented by the queueing application 122. The event queue 125 can contain data from one or more IoT devices 113 or client devices 109 that generate event data. The event queue 125 can make the event data accessible to the root node 202 of the network topology 128. The event queue 125 can operate on a push or pull model, where event data received from IoT devices 113 or client devices 109 is pushed to the root node 202 executing on a computing instance 151 or where the computing instance 151 retrieves the root node 202 from the event queue 125 when it has sufficient resources to process an additional event.

In the depicted network topology 128, the root node can separate events obtained from the event queue 125 into various "type" nodes that are dependent upon a field within the event data. In the depicted example, the root node 202 can determine whether a type of the event data corresponds to a condition specified by nodes 204, 206, and 208. In this sense, the first level of nodes below the root node 202 can be considered "type" nodes because the root nodes segregate event data based on a data type. In the depicted example, node 202 receives event data that is associated with a location type, node 204 receives data that is associated with a sensor type, and node 206 receives data associated with a zone type.

The next level of nodes 210, 212, and 214 are "select" nodes because they reflect conditions that act on a single type of data. For example, node 210 operates if the location data type is "true." Node 212 operates if the "sensor.temp" data type is greater than 2, and Node 214 operates if the "zone.type" is "freezer." The events that match the select nodes flow downstream to "join" nodes, which are join expressions on one or more data types. Join nodes, in some cases, can link to other join nodes representing complex multi-type conditions.

Nodes 216 and 218 represent "join" nodes, which are join expressions on one or more data types. Join nodes can also link to other join nodes in the network topology 128 and represent complex multi-layered joins. Node 220 represents a terminal node that triggers an action defined by the rule definition. In the example of FIG. 2, node 220 triggers an alert to be sent in response to the conditions specified by the select nodes being evaluated as true and can incorporate the data passed to the terminal node from the join nodes.

In the context of FIG. 2, the nodes of the network topology 128 can communicate by passing events to each other. The nodes do not have to be in the same process or even the computing instance 151. This property results in the ability for the nodes to be distributed across a cluster of machines, virtual or physical, within the computing environment cluster 103. Additionally, as long as each node processes its upstream messages sequentially, all nodes can work in parallel on a stream of event data obtained from the event queue 125. Because every node can maintain a cache of successful matches to event data provided by its parent node or by the event queue 125, and the nodes can also store, in node working memory 171 multiple versions of successful matches allowing for time series queries, such as the last N reported values that match the conditions of the node.

Nodes can communicate with one another, in one scenario, using a serialized form of the event data that can be sent between the nodes. For example, JSON or XML data can be used to send data between nodes. A type node can pass all events of a given type to the select node. A select node can propagate only the events that match the selection criteria that is specified by the node. A join node can generate and transmit an aggregate event since the node can receive multiple inputs of different types. Eventually, when a terminal node is activated and an action taken as defined by the rules engine, the terminal node can receive a combined event that includes all of the different objects that were generated by the preceding nodes in the hierarchy.

Figure 3:
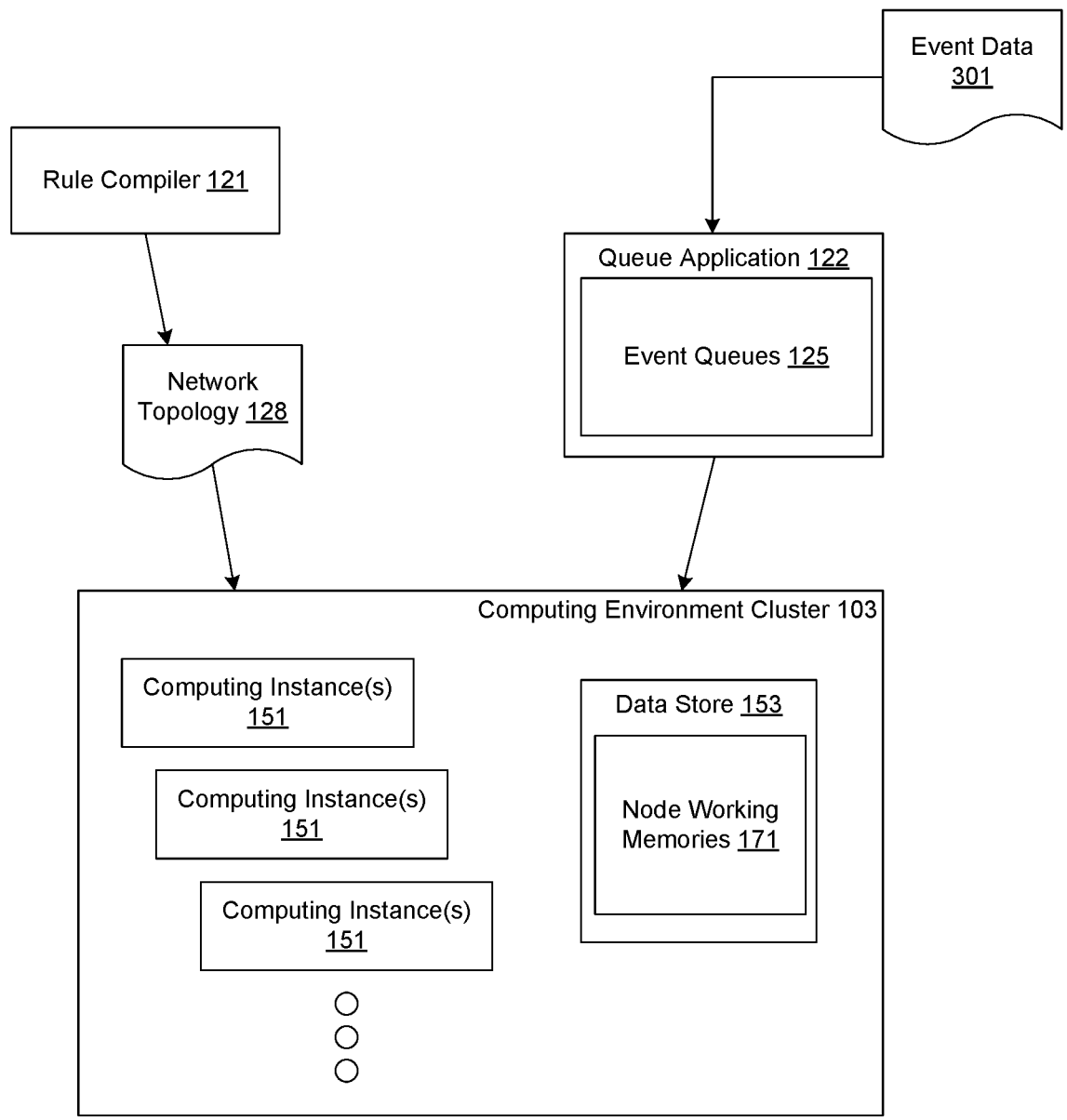
FIG. 3 is a drawing of an alternative depiction of a networked environment according to one example of the disclosure.

FIG. 3 shows an alternative depiction of the architecture of a rules engine implemented according to an embodiment of the disclosure. The rule compiler 121 can take a set of rules, or a rule definition, that is written in a domain specific language (DSL), such as a SQL or SQL-variant, and translate the rule definition into network topology 128. The rule compiler 121 or another process, such as the management service 120, can deploy the network topology 128 across various computing instances 151 within the computing environment cluster 103.

A single node can be deployed on a single computing instance 151 in one scenario. Alternatively, multiple nodes can be deployed on a single computing instance 151 depending upon the existing load and resources of the computing instance 151. The rules engine runs as a cluster of nodes that is distributed across the computing environment cluster 103. The network topology 128 generated by the rule compiler 121 is distributed across various computing instances 151, with the root node being configured to obtain or receive event data from the event queue 125.

Nodes 163 can be distributed and implemented within the computing environment cluster 103 as uniquely addressable actors within the cluster. When a node 163 sends a message to another node, the node 163 can use a unique UUID or network address associated with the node 163 as the key and route the message to the computing instance 151 hosting the key. Every node can be hosted on one unique process instance within the computing environment cluster 103, regardless of how the nodes are distributed across computing instances 151.

In the event of a computing instance 151 failure, the nodes can be redistributed within the cluster, so subsequent messages destined for the node can be rerouted to a new computing instance 151 hosting the node. A data element that successfully matches a condition is propagated downstream and can be cached in the node working memory 171 of the node. The message itself can be a serialized form of event data.

Additionally, embodiments of the disclosure can facilitate updating of a network topology 128 that is deployed on the computing environment cluster 103. Updating of the topology can be performed by the rule compiler 121, management service 120, or other process. To update a network topology 128, the root node of the topology can suspend reading event data from the event queue 125. The remaining nodes, including the root node, can continue processing event data that is actively being processed by the respective node. In this sense, the network topology 128 can be drained of active processing tasks.

The rule compiler 121 can create a new network topology 128 from an updated or changed rule definition provided by a user. The rule compiler 121 can merge any new or updated nodes with the network topology 128. In some cases, certain nodes might be orphaned by the newly updated topology 128. The orphaned nodes can be removed. The nodes within the network topology 128 can then reprocess messages from parents for nodes that are updated in the network topology. For example, a select node can process all objects for a respective type again. A join node can re-evaluate the join for every record in its respective parent nodes. The root node can then resume obtaining event data from the event queue 125 and processes event data that has queued since the suspension of reading event data from the queue.

Figure 4:
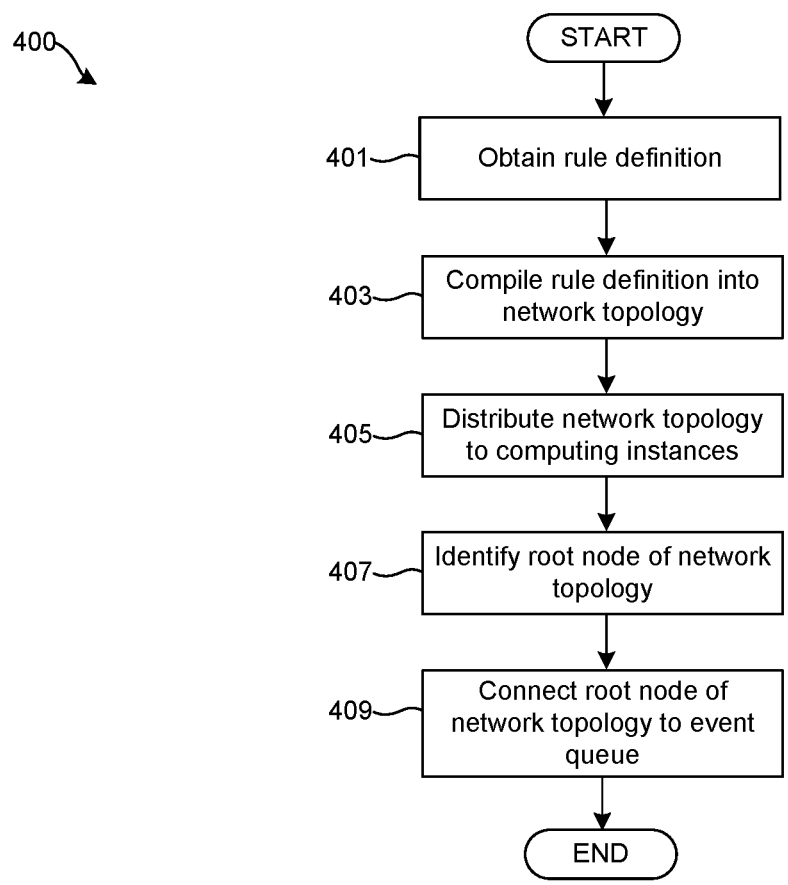
FIG. 4 is a flowchart illustrating functionality implemented by components of the networked environment.

FIG. 4 shows a flowchart 400 that illustrates an example of the operation of the rule compiler 121 deploying a rule definition onto a rules engine implemented according to examples of the disclosure. The process shown in FIG. 3 illustrates how the rule compiler 121 can generate a network topology 128 and deploy the nodes of the topology to the computing environment cluster 103 according to various examples.

In step 401, the rule compiler 121 can obtain a rule definition. The rule definition can define the entities, conditions, and rules that apply to the respective entities. The rule definition can be written in a scripting language or a domain specific language such as SQL or an SQL variant. The rule definition can include entities, rules, and actions. An entity can identify at least one of an input into the rules engine, the input being defined in terms of one or more of a population of devices that feed data inputs or events into the rules engine. The rule definition can also define one or more rules. A rule can specify at least one condition that references one or more of the population of devices. The rule definition can also identify one or more actions that can be taken in response to a data input.

At step 403, the rule compiler 121 can compile the rule definition to generate a network topology 128. The network topology 128 can be a Rete network, a graph, tree, or other data structure that can represent a rule definition that can be navigated and deployed on various computing instances 161.

At step 405, the rule compiler 121 can deploy or distribute the network topology 128, or the nodes of the network topology 128 among one or more computing instances 151 in the computing environment cluster 103. In one example, each of the nodes can be executed in a separate process within one or more instances. The nodes can be assigned a unique identifier. The unique identifier or related or connected nodes can be identified in configuration data that is accessible to the process in which each of the nodes are executed. For example, configuration data stored in the node working memory 171 can identify parent and child nodes by their unique identifiers or network address. In this way, once deployed, the various nodes in the topology can communicate data among one another.

At step 407, the rule compiler 121 can identify the root node of the network topology 128. The root node can select the appropriate select nodes that event data can be communicated to in order to initiate processing of event data according to the rule definition.

At step 409, the root node of the network topology can be connected to the event queue 125. As events from IoT devices 113 or client devices 109 flow into the event queue 125, the root node can retrieve the event data from the event queue 125 and communicate the event data to its child nodes as appropriate. The child nodes can then communicate processed event data as messages to their respective child nodes until one or more terminal nodes that specify an action are reached. In this way, the rules engine can be implemented in a distributed fashion.

The IoT devices 113, client devices 109, and devices including the management system 106 can include at least one processor circuit, for example, having a processor and at least one memory device, both of which couple to a local interface, respectively. The device can include, for example, at least one computer, a mobile device, smartphone, computing device, server device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, client devices 109, and devices including the management system 106 can include a display upon which user interfaces can be rendered. The IoT devices 113, client devices 109, and devices including the management system 106 can also include one or more input/output devices that can include, for example, a capacitive touchscreen or other type of touch input device, fingerprint reader, or keyboard.

Although the management service 120, rule compiler 121 and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for deploying a rules engine for processing events received from a population of devices, comprising:
at least one computing device executing a plurality of instructions that, when executed, cause the at least one computing device to at least:
obtain a rule definition identifying an input into the rules engine, wherein the input is defined in terms of at least one of the population of devices, wherein the rule definition identifies at least one condition referencing at least one of the population of devices and at least one action taken on the at least one of the population of devices;
generate a network topology based upon the rule definition, wherein the network topology separates the rule definition into a plurality of nodes, and wherein the plurality of nodes comprises at least one select node, at least one join node, or at least one terminal node;
distribute a plurality of nodes of the network topology for execution by a plurality of computing instances; and
identify a root node of the network topology.

2. The system of claim 1, wherein execution of the root node in response to receiving a first input causes a first data output to be sent to the at least one select node, and wherein the at least one select node determines that the first input is associated with the rule definition.

3. The system of claim 2, wherein execution of the at least one select node causes a second data output to be sent to the at least one join node, and wherein the at least one join node determines whether the rule definition applies to the first input.

4. The system of claim 3, wherein execution of the at least one join node causes a third data output to the at least one terminal node, and wherein the at least one terminal node causes the at least one action to be taken.

5. The system of claim 1, wherein the plurality of nodes are executed in separate computing devices in a cluster of computing devices.

6. The system of claim 1, wherein the instructions, when executed, further cause the at least one computing device to:
obtain an update to the rule definition;
generate a new network topology based upon the update to the rule definition; and
distribute a plurality of updated nodes for execution by the plurality of computing instances.

7. The system of claim 1, wherein the instructions, when executed, further cause the at least one computing device to:
associate a respective network address with the plurality of nodes, wherein respective ones of the plurality of nodes are addressable by another one of the plurality of nodes using the respective network address.

8. A non-transitory computer-readable medium embodying instructions executable in at least one computing device for deploying a rules engine for processing events received from a population of devices, wherein when executed the instructions cause the at least one computing device to:
obtain a rule definition identifying an input into the rules engine, wherein the input is defined in terms of at least one of the population of devices, wherein the rule definition identifies at least one condition referencing at least one of the population of devices and at least one action taken on the at least one of the population of devices;
generate a network topology based upon the rule definition, wherein the network topology separates the rule definition into a plurality of nodes, and wherein the plurality of nodes comprises at least one select node, at least one join node, or at least one terminal node;
distribute a plurality of nodes of the network topology for execution by a plurality of computing instances; and
identify a root node of the network topology.

9. The non-transitory computer-readable medium of claim 8, wherein execution of the root node in response to receiving a first input causes a first data output to be sent to the at least one select node, and wherein the at least one select node determines that the first input is associated with the rule.

10. The non-transitory computer-readable medium of claim 9, wherein execution of the at least one select node causes a second data output to be sent to the at least one join node, and wherein the at least one join node determines whether the rule applies to the first input.

11. The non-transitory computer-readable medium of claim 10, wherein execution of the at least one join node causes a third data output to the at least one terminal node, and wherein the at least one terminal node causes the at least one action to be taken.

12. The non-transitory computer-readable medium of claim 8, wherein the plurality of nodes are executed in separate computing devices in a cluster of computing devices.

13. The non-transitory computer-readable medium of claim 8, wherein the instructions, when executed, further cause the at least one computing device to:
obtain an update to the rule definition;
generate a new network topology based upon the update to the rule definition; and
distribute a plurality of updated nodes for execution by the plurality of computing instances.

14. The non-transitory computer-readable medium of claim 8, wherein the instructions, when executed, further cause the at least one computing device to:
associate a respective network address with the plurality of nodes, wherein respective ones of the plurality of nodes are addressable by another one of the plurality of nodes using the respective network address.

15. A method for deploying a rules engine for processing events received from a population of devices, comprising:
obtaining a rule definition identifying an input into the rules engine, wherein the input is defined in terms of at least one of the population of devices, wherein the rule definition identifies at least one condition referencing at least one of the population of devices and at least one action taken on the at least one of the population of devices;
generating a network topology based upon the rule definition, wherein the network topology separates the rule definition into a plurality of nodes, and wherein the plurality of nodes comprises at least one select node, at least one join node, or at least one terminal node;

distributing a plurality of nodes of the network topology for execution by a plurality of computing instances; and identifying a root node of the network topology.

16. The method of claim 15, wherein execution of the root node in response to receiving a first input causes a first data output to be sent to the at least one select node, and wherein the at least one select node determines that the first input is associated with the rule.

17. The method of claim 16, wherein execution of the at least one select node causes a second data output to be sent to the at least one join node, and wherein the at least one join node determines whether the rule applies to the first input.

18. The method of claim 17, wherein execution of the at least one join node causes a third data output to the at least one terminal node, and wherein the at least one terminal node causes the at least one action to be taken.

19. The method of claim 15, wherein the plurality of nodes are executed in separate computing devices in a cluster of computing devices.

20. The method of claim 15, further comprising:

obtaining an update to the rule definition;

generating a new network topology based upon the update to the rule definition; and distributing a plurality of updated nodes for execution by the plurality of computing instances.

* * * * *